United States Patent
Callahan et al.

(10) Patent No.: US 10,841,200 B2
(45) Date of Patent: Nov. 17, 2020

(54) DIFFERENTIATED ROUTING SYSTEM AND METHOD

(71) Applicant: Level 3 Communications, LLC, Broomfield, CO (US)

(72) Inventors: Patrick S. Callahan, Thornton, CO (US); Richard Dean Terpstra, Superior, CO (US); Adam Charles Uzelac, Rochester, NY (US)

(73) Assignee: Level 3 Communications, LLC, Broomfield, CO (US)

( * ) Notice: Subject to any disclaimer, the term of this patent is extended or adjusted under 35 U.S.C. 154(b) by 525 days.

(21) Appl. No.: 15/595,384

(22) Filed: May 15, 2017

(65) Prior Publication Data

US 2017/0250895 A1 Aug. 31, 2017

Related U.S. Application Data

(63) Continuation of application No. 14/178,941, filed on Feb. 12, 2014, now Pat. No. 9,654,381.

(51) Int. Cl.
 *H04L 12/715* (2013.01)
 *H04L 12/725* (2013.01)
 (Continued)

(52) U.S. Cl.
 CPC .............. *H04L 45/04* (2013.01); *H04L 45/22* (2013.01); *H04L 45/308* (2013.01);
 (Continued)

(58) Field of Classification Search
 CPC ....... H04L 63/10; H04L 45/22; H04L 45/308; H04L 29/06068; H04L 45/04; H04L 47/785; H04W 36/12
 See application file for complete search history.

(56) References Cited

U.S. PATENT DOCUMENTS

| 7,633,909 B1 | 12/2009 | Jones et al. |
| 2003/0152042 A1* | 8/2003 | Soininen ................ H04L 45/42 370/310 |

(Continued)

FOREIGN PATENT DOCUMENTS

| EP | 1841143 A1 | 10/2007 |
| WO | WO-2013030313 A1 | 3/2013 |

OTHER PUBLICATIONS

International Preliminary Report on Patentability, dated Aug. 16, 2016, Int'l Appl. No. PCT/US15/015677, Int'l Filing Date Feb. 12, 2015; 5 pgs.

(Continued)

*Primary Examiner* — Oussama Roudani

(57) ABSTRACT

A differentiated routing system is provided for routing a communication service according to an access point of a subscriber terminal to a first network domain. The system includes a computing system executing a core routing engine (CRE) that receives a request for a communication service from the subscriber terminal. When the communication service is to be routed to a second network domain, the CRE identifies an access point at which the subscriber terminal accesses the first network domain, includes a tag in the request according to the identified access point. The tag includes information to be used by the second network domain for routing the communication service. The CRE then transmits the request to the second network domain.

17 Claims, 10 Drawing Sheets

(51) Int. Cl.
  *H04L 12/915* (2013.01)
  *H04L 12/707* (2013.01)
  *H04L 29/06* (2006.01)
  *H04W 40/02* (2009.01)

(52) U.S. Cl.
  CPC ............ *H04L 47/785* (2013.01); *H04L 63/10* (2013.01); *H04W 40/02* (2013.01)

(56) References Cited

U.S. PATENT DOCUMENTS

| | | | |
|---|---|---|---|
| 2008/0244076 A1* | 10/2008 | Shah | H04W 4/02 709/227 |
| 2009/0129387 A1 | 5/2009 | Retana et al. | |
| 2009/0182874 A1 | 7/2009 | Morford | |
| 2009/0252134 A1* | 10/2009 | Schlicht | H04L 1/0015 370/338 |
| 2012/0106560 A1* | 5/2012 | Gumaste | H04L 45/04 370/401 |
| 2012/0155442 A1 | 6/2012 | Haddad et al. | |
| 2015/0043383 A1* | 2/2015 | Farkas | H04L 45/22 370/254 |
| 2015/0043453 A1* | 2/2015 | Hegarty | H04L 65/1016 370/329 |
| 2015/0230149 A1 | 8/2015 | Callahan et al. | |

OTHER PUBLICATIONS

International Search Report, dated May 20, 2015, Int'l Appl. No. PCT/US15/015677, Int'l Filing Date Feb. 12, 2015; 3 pgs.

Written Opinion of the International Searching Authority, dated May 20, 2015, Int'l Appl. No. PCT/US15/015677, Int'l Filing Date Feb. 12, 2015; 3 pgs.

Extended European Search Report, dated Oct. 6, 2017, Application No. 15748492.4, filed Feb. 12, 2015; 8 pgs.

* cited by examiner

DIFFERENTIATED ROUTING SYSTEM AND METHOD

CROSS-REFERENCE TO RELATED APPLICATIONS

This application is a continuation of and claims the benefit of priority from U.S. patent application Ser. No. 14/178,941, entitled "DIFFERENTIATED ROUTING SYSTEM AND METHOD," filed Feb. 12, 2014, the entire contents of which are fully incorporated by reference herein for all purposes.

TECHNICAL FIELD

Aspects of the present disclosure relate to communication networks and, in particular, to a system and method for differentiated routing of communication services through a communication network domain according to routing plan information associated with an access point of a subscriber terminal into the network domain.

BACKGROUND

Communication service providers (CSPs) generally refer to those companies that provide telecommunication services, such as voice and data communications access. Whereas telecommunication services have been traditionally provided by relatively few companies, multiple CSPs now typically operate to provide these services in any given region. In many cases, the growth in the number of CSPs has created a favorable environment in which multiple CSPs may compete for market share with ever-increasing goods and services to be provided for their customers.

Each CSP may operate multiple domains to provide communication services to their subscribers. Although management of communication services may appear to be easier using a single domain, this configuration is not feasible when operating a large network. For example, operation of communication networks that cross international boundaries may be difficult to implement given the differing regulations that are required to be applied in each jurisdiction. Moreover, communication domains operating in one particular region may be constrained to providing different levels of service from what is normally provided when handling communication services from other regional boundaries in which foreign domains impose regulations and/or restrictions not required in their native domain. Accordingly, segregating communication services according to each national boundary provides an efficient manner of managing communication networks. Additionally, subscribers often have communication needs that differ from one another. Whereas some subscribers expect communication services at cost effective prices, other subscribers demand a relatively high level of service.

To resolve these issues, CSPs typically operate multiple network domains in which communication services between these domains are provided by bridge ports that generally function as gateways that provide communication to other network domains. Although bridge ports may provide one technique for segregating routes, they are generally not scalable when used in large networks operating with multiple domains and with subscribers whose expected levels of service continually change on an ongoing basis. Within the context of the present disclosure, the term "scalable" means an attribute of a network that represents an ability of the network to grow in size while continuing to provide its intended functionality, which pertaining to the statement above, is the ability to use bridge ports for segregating routes while growing the size of the system. For example, to provide routing of differing types and levels of communication services, a separate bridge port for each type and level of communication service would be required, which would be cumbersome when used with multiple number of large network domains. It is with these issues in mind, among others, that various aspects of the present disclosure were developed.

SUMMARY

According to one aspect, a differentiated routing system is provided for routing a communication service according to an access point of a subscriber terminal to a first network domain. The system includes a computing system executing a core routing engine (CRE) that receives a request for a communication service from the subscriber terminal. When the communication service is to be routed to a second network domain, the CRE identifies an access point at which the subscriber terminal accesses the first network domain, includes a tag in the request according to the identified access point. The tag includes information to be used by the second network domain for routing the communication service. The CRE then transmits the request to the second network domain.

According to another aspect, a differentiated routing method includes receiving, by a core routing engine (CRE) of a first network domain, a request for a communication service from a subscriber terminal. When the communication service is to be routed to a second network domain, the CRE identifies an access point at which the subscriber terminal accesses the first network domain, includes a tag in the request according to the identified access point. The tag includes information to be used by the second network domain for routing the communication service. The CRE then transmits the request to the second network domain.

According to yet another aspect, software instructions executable on a computing system is operable to perform receiving, by a core routing engine (CRE) of a first network domain, a request for a communication service from a subscriber terminal. When the communication service is to be routed to a second network domain, the software instructions identify an access point at which the subscriber terminal accesses the first network domain, includes a tag in the request according to the identified access point. The tag includes information to be used by the second network domain for routing the communication service. The software instructions then transmit the request to the second network domain.

DETAILED DESCRIPTION

Aspects of a differentiated routing system described herein enables the differentiated routing of communication services for subscriber terminals through multiple network domains according to an access point at which the subscriber terminal enters each network domain. A communication service provider (CSP) typically provides communication services to its subscriber terminals according to previously established service plans (e.g., service contracts). Generally, this service plan indicates the type and/or level of services that the CSP is to provide to the subscriber. The type and level of services may include, for example, whether voice, data, short messaging services (SMS), multimedia messaging services (MMS), or any combination thereof are to be provided, the maximum allowable usage in the form of voice call minutes, time of day usage, and/or data bandwidth allocation, and the like. The differentiated routing system provides tags that provide information for generating differentiated classes of routing through foreign network domains based on a class of service for each subscriber terminal.

More specifically, the differentiated routing system includes at least one core routing engine (CRE) that administers access of subscriber terminals to its associated domain by associating a subscriber terminal, such as a customer premises equipment (CPE) or wireless handset, with an access point into the domain. When a request for a communication service is to be routed to a second, foreign network domain, the CRE appends a tag to the request such that the CRE of the foreign network domain may route the communication service according to information included in the tag. In this manner, communication services that traverse one or more separately managed network domains may be routed in a manner that optimally utilizes resources according to a combination of cost and quality.

Figure 1A:
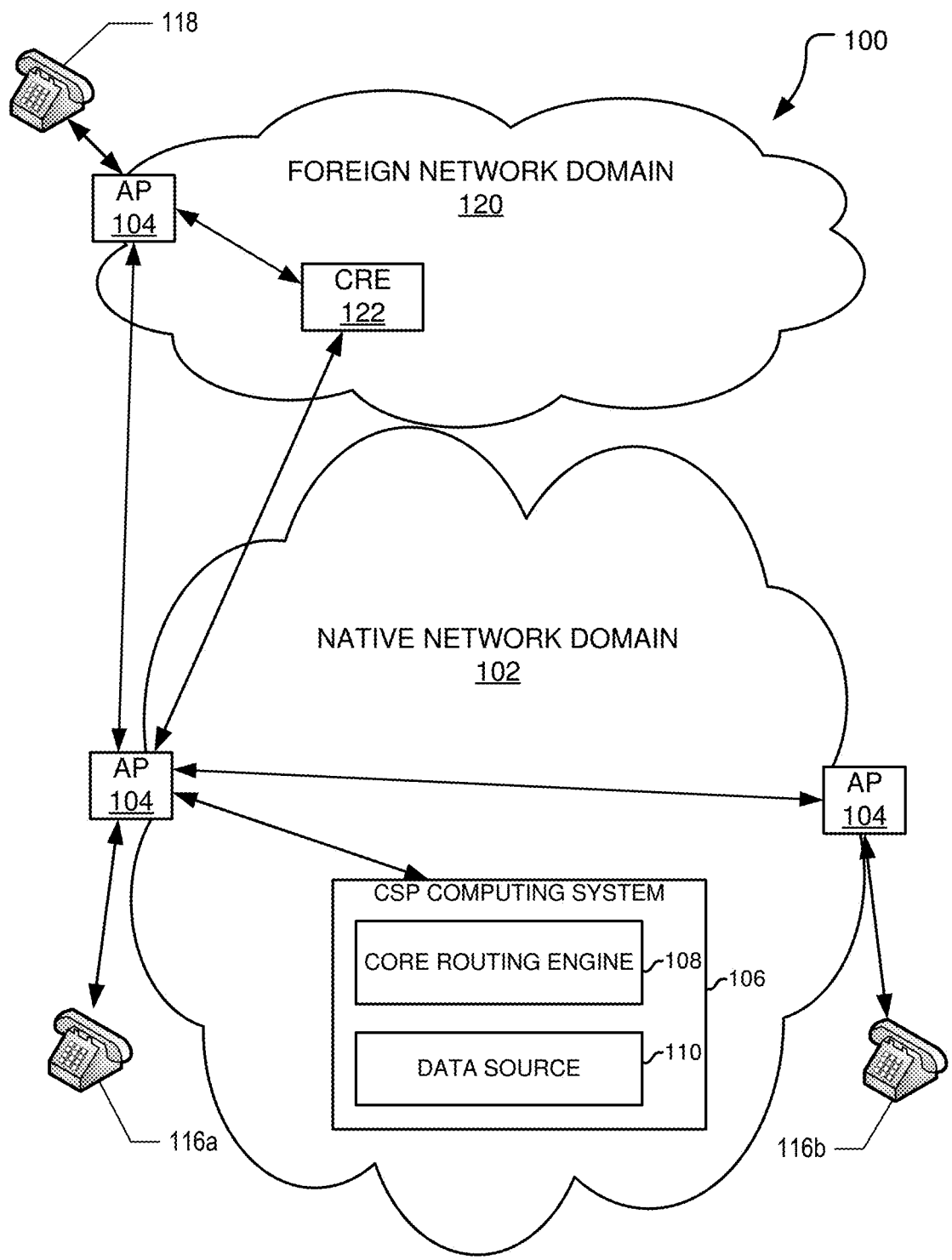
FIG. 1A is a block diagram of an example communication network 100 that implements a differentiated routing system according to one aspect of the present disclosure.
Figure 1B:
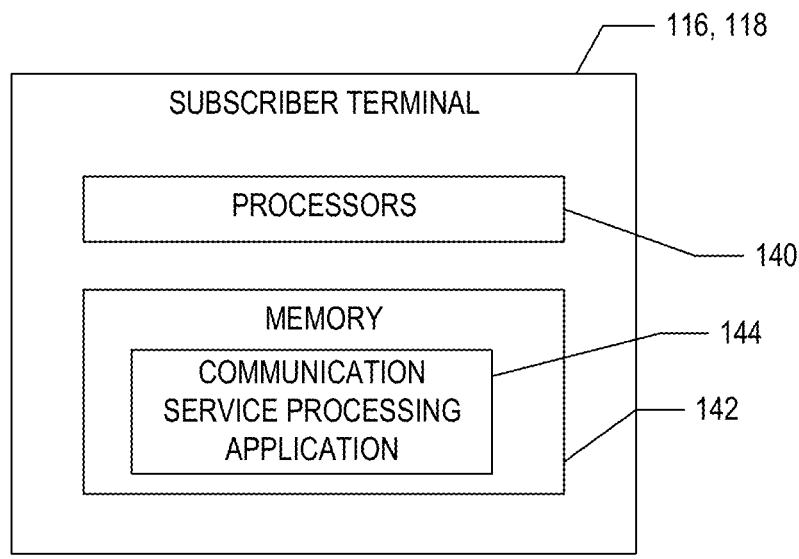
FIG. 1B depicts an example computing device according to one aspect of the present disclosure.
Figure 1C:
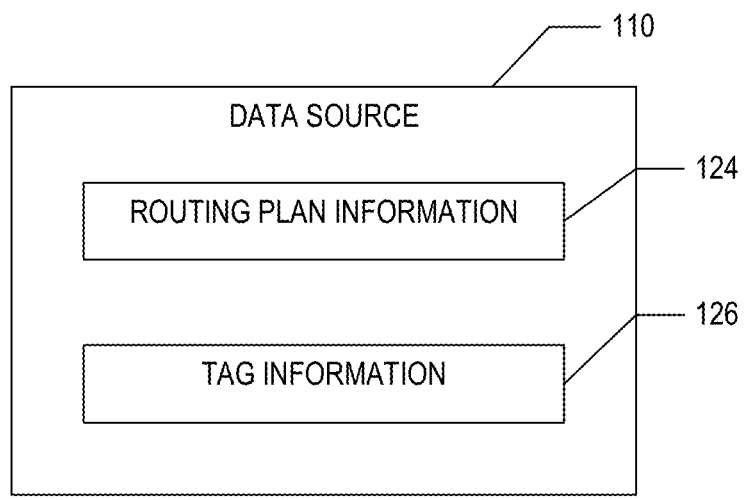
FIG. 1C depicts an example data source according to one aspect of the present disclosure.

FIGS. 1A through 1C depict an example differentiated routing system 100 according to aspects of the disclosure. The system 100 includes multiple domains including a native network domain 102 and one or more foreign network domains 120, each having multiple access points (APs) 104, and a communication service provider (CSP) computing system 106 or other computing device or system that includes a core routing engine 108 and a data source 110. When a request for a communication service from a subscriber terminal 116a to a subscriber terminal 116b within the native network domain 102, the CRE 108 handles the request in the normal manner. However, when a request for a communication service from a subscriber terminal 116a is made to a subscriber terminal 118 of a foreign network domain 120, the CRE appends a tag to the request and forwards the request to the CRE 122 of the foreign network domain 120 such that the CRE 122 may route the requested communication service according to information included in the appended tag.

The CRE 122 is executed on a CSP computing system that is similar in design and purpose the CSP computing system 106 as described herein. Nevertheless, only the CRE computing system 106 is shown and described herein for brevity and clarity of description. The native network domain 102 and foreign network domain 120 may be owned and managed by a single CSP, or the native network domain 102 and foreign network domains 120 may be owned and managed by differing CSPs.

The term "native domain" generally refers to a network domain in which the CSP computing system 106 operates, while the term "foreign domain" generally refers to a network domain not controlled and/or managed by the CSP computing system 106. Nevertheless, it should be understood that other foreign network domains may also have its own CSP computing system such that its domain functions as a native network domain and other domains function as foreign network domains.

The access point may be any node at which the subscriber terminal 116a or 116b of the native network domain 102 or the subscriber terminal 118 of the foreign network domain 120 access the communication network 100. For example, subscriber terminal 116a is configured to requests communication services through one access point (AP) 104, while subscriber terminal 116b is configured to request communication services through another AP 104. Thus, each AP 104 functions as a gateway for subscriber terminals 116a, 116b, respectively, and may each be associated with a particular class of routing that differs from one another. For example, the CSP that administers the native network domain 102, which provides a certain specified level of communication services to a first group of subscribers under a first routing plan, allows access to the domain through a dedicated access link (DAL) via the first AP 104. Conversely, the CSP which provides a differing level of communication services to a second group of subscribers under a second routing plan allows access to the native network domain 102 through another DAL via the second AP 104. By identifying the AP from which a request is made, the CSP generates a tag specific to the AP associated with the subscriber terminal making the request when the request extends across network domain boundaries to a foreign network domain. Each access point has one or more processors and executable instructions stored in volatile and/or non-volatile memory for performing the actions and/or steps described herein.

In general, a service plan from which the routing plan is generated, includes a contractual agreement between the CSP and a user of the subscriber terminal specifying what services are to be provided and any performance levels associated with these services. For example, the service plan may be one of multiple differing service plans offered by a CSP. That is, the CSP may offer multiple service plans that each provides differing combinations and levels of communication services, such as voice communication services, video communication services, and/or data communication services, such as short messaging services (SMS), multimedia messaging services (MMS), and the like. Additionally, the service plans offered by the CSP may specify varying performance levels associated with each communication service, such as quality of service (QoS) or grade of service (GoS) levels.

In one embodiment, the native network domain 102 and/or the foreign network domain 120 are internet protocol (IP) domains that provide communication services via a data network, such as the Internet. For example, voice communication services may be provided through such networks via voice over IP (VoIP) protocol. In this case, the tag transmitted between the native network domain 102 and foreign network domain 120 may be included in a session initiation protocol-uniform resource identifier (SIP-URI). For example, when the CRE 1108 determines that the communication service is to extend to the foreign network domain 120, the CRE 108 generates a SIP-URI in the form 'user@route1.enterprise.com' in which the 'route1.enterprise.com' portion of the SIP-URI comprises the tag used by the CRE 122 of the foreign network domain 120 for differentiated routing through its network domain. Nevertheless, any suitable form of tag may be used. For example, a certain code (e.g., 'zh12345rp') prepended to the SIP-URI may comprise a tag that is used by the CRE 122 of the foreign network domain 120 for differentiated routing through its network domain.

The data source 110 stores routing plan information 124 associated with each AP 104 and tag information 126. The routing plan information may be used to associate incoming requests from other foreign network domains with particular routes to be generated for those requests. The tag information 126 to be used for generating tags to be appended to requests when the request extend to foreign network domains as well as interpreting tag information received in requests from these other foreign network domains. Although the data source 110 is shown as being located on, at, or within the CSP computing system 106, it is contemplated that the data source 110 can be located remotely from the CSP computing system 106, such as on, at, or within the memory 142 of the subscriber terminal 116a, 116b, and/or 118.

The CRE 108 also provides for selective routing of communication services for requests from a subscriber terminal 118 originating from a foreign network domain 120. When a request for a communication service is made by the subscriber terminal 118 from the foreign network domain 120, the CRE 108 may route calls through the native network domain 102 according to service plan information associated with the subscriber terminal 118 of the foreign native network domain 102 that originated the request.

Certain embodiments of the present disclosure may provide an advantage over traditional communication services in that services provided by each network domain may be optimized according to the capabilities of the network domain. For example, the CRE 108 may be aware that of limited capacities of certain features of its respective network domain and regulate their usage by differentiated routing to manage the limited capacities of each feature. Additionally, the domains that manage their respective networks may individually negotiate costs schedules with one another for each level and/or quality of communication service to be provided, thus providing a level of granularity to their communication services not heretofore provided by traditional pricing structures used among participating CSPs.

As an example, certain subscribers such as telemarketers, which are generally referred to as dialers, often generate high levels of call requests while producing relatively little answer volume, thus resulting in a poor answer seizure ratio. Because answer seizure ratio metrics, however, are an important indicator of a network's performance, telemarketing subscribers may unduly affect the metrics indicating how well the network is performing. Certain embodiments of the present disclosure may provide a solution to this problem by segregating telemarketing subscribers in a separate routing plan such that metrics may be obtained for telemarketing subscribers independently of other generic subscribers.

The CSP computing system 106 includes a processing system 202 (FIG. 2) that executes the core routing engine 108 stored in volatile and/or non-volatile memory 204 (i.e., computer readable media) using the data source 110. Examples of such a computing system include one or more servers, personal computers, mobile computers and/or other mobile devices, and other computing devices. The CSP computing system 106 may communicate with the subscriber terminals 116, 118, and/or foreign network domains 120 via wireless and/or wireline communications.

FIG. 1B depicts an example subscriber terminal 116, 118 according to one aspect of the differentiated routing system 100. The subscriber terminal 116, 118 is a computing or processing device that includes one or more processors 140 and memory 142 and is to receive data and/or communications from, and/or transmit data and/or communications to, the CSP computing system 106 via the native network domain 102 and/or foreign network domain 120. For example, the subscriber terminal 116, 118 can be a wireless telephone, a landline telephone, or any suitable computing device, such as a personal computer, such as a laptop or notebook computer, a workstation, or other processing device such as a personal digital assistant or a tablet computer. The memory stores a communication service processing application 144 for handling one or more communication services with the CRE 108, such as requesting a communication service (e.g., call setup), voice and/or data transmission between the subscriber terminal 116, 118 and the CRE 108.

Figure 2:
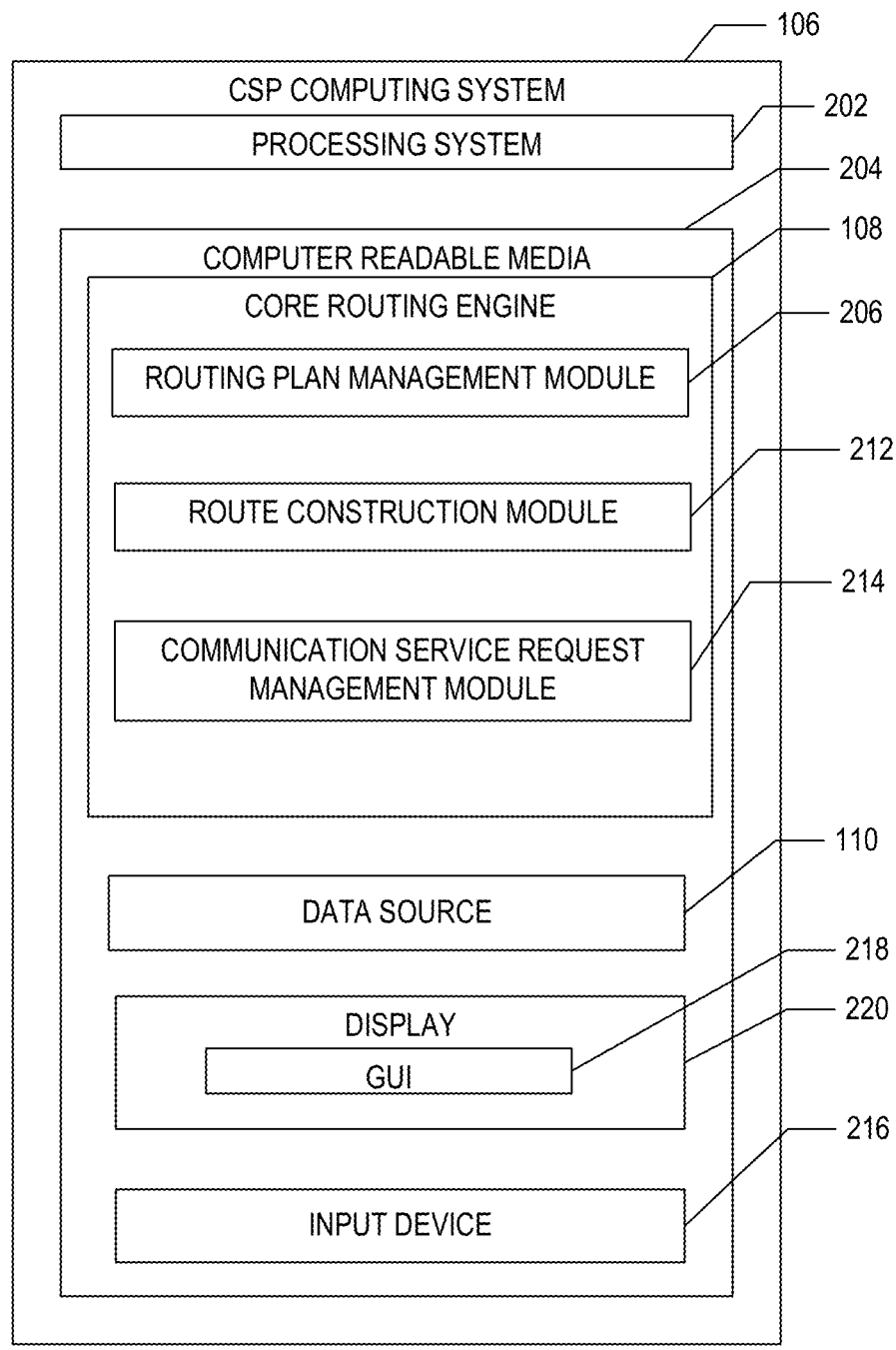
FIG. 2 depicts a diagram of an example communication service provider computing system according to one aspect of the present disclosure.

FIG. 2 is a block diagram depicting an example core routing engine 108 executing on the CSP computing system 106. According to one aspect, the CSP computing system 106 includes a processing system 202 that includes one or more processors or other processing devices. A processor is hardware. The processing system 202 executes the core routing engine 108 to selectively route communication services according to a service plan associated with a subscriber terminal 116, 118 that initiates a request for such services.

According to one aspect, the CSP computing system 106 includes a computer readable media 204 on which the core routing engine 108 and data source 110 are stored. The core routing engine 108 includes instructions or modules that are executable by the processing system 202 to perform the features of the CRE 108 described herein.

The computer readable media 204 may include volatile media, nonvolatile media, removable media, non-removable media, and/or another available media that can be accessed by the CSP computing system 106. By way of example and not limitation, computer readable media 204 comprises computer storage media and communication media. Computer storage media includes non-transient storage memory/media, volatile media, nonvolatile media, removable media, and/or non-removable media implemented in a method or technology for storage of information, such as computer/ machine readable/executable instructions, data structures, program modules, and/or other data. Communication media may embody computer readable instructions, data structures, program modules, or other data and include an information delivery media or system.

A routing plan management module 206 processes the routing plans used by the network domain 102, and stores the processed routing plan information 124 in the data source 110. For example, the routing plan management module 206 may store details associated with certain agreed upon criteria of a routing plan entered into between the CSP that manages the native network domain 102 and users of each subscriber terminal 116, 118. Additionally, the routing plan management module 206 may generate routing plan information for foreign network domains according to a level of service provided by the routing plans associated with these foreign network domains.

A route construction module 212 generates routes to be used by subscriber terminals. For example, communication services that are terminated entirely within the native network domain, a standardized routing scheme may be used. However, if the communication service originates from a foreign network domain, the route construction module 212 generates a class of routing according to information included in the tag appended to the request for the communication service.

A communication service request management module 214 handles requests for communication services from subscriber terminals. For example, the communication service request management module 214, upon receipt of a request for a communication service, determines whether the communication service is to extend beyond the native network domain. If so, the communication service request module 214 appends a tag such that the foreign domain may route the communication session according to information included in the tag.

It should be appreciated that the modules described herein are provided only as an example of a computing device that may execute the core routing engine 108 according to the teachings of the present invention, and that other computing devices may have the same modules, different modules, additional modules, or fewer modules than those described herein. For example, one or more modules as described in FIG. 2 may be combined into a single module. As another example, certain modules described herein may be encoded and executed on other computing devices, such as the subscriber terminal used by the user.

Figure 3:
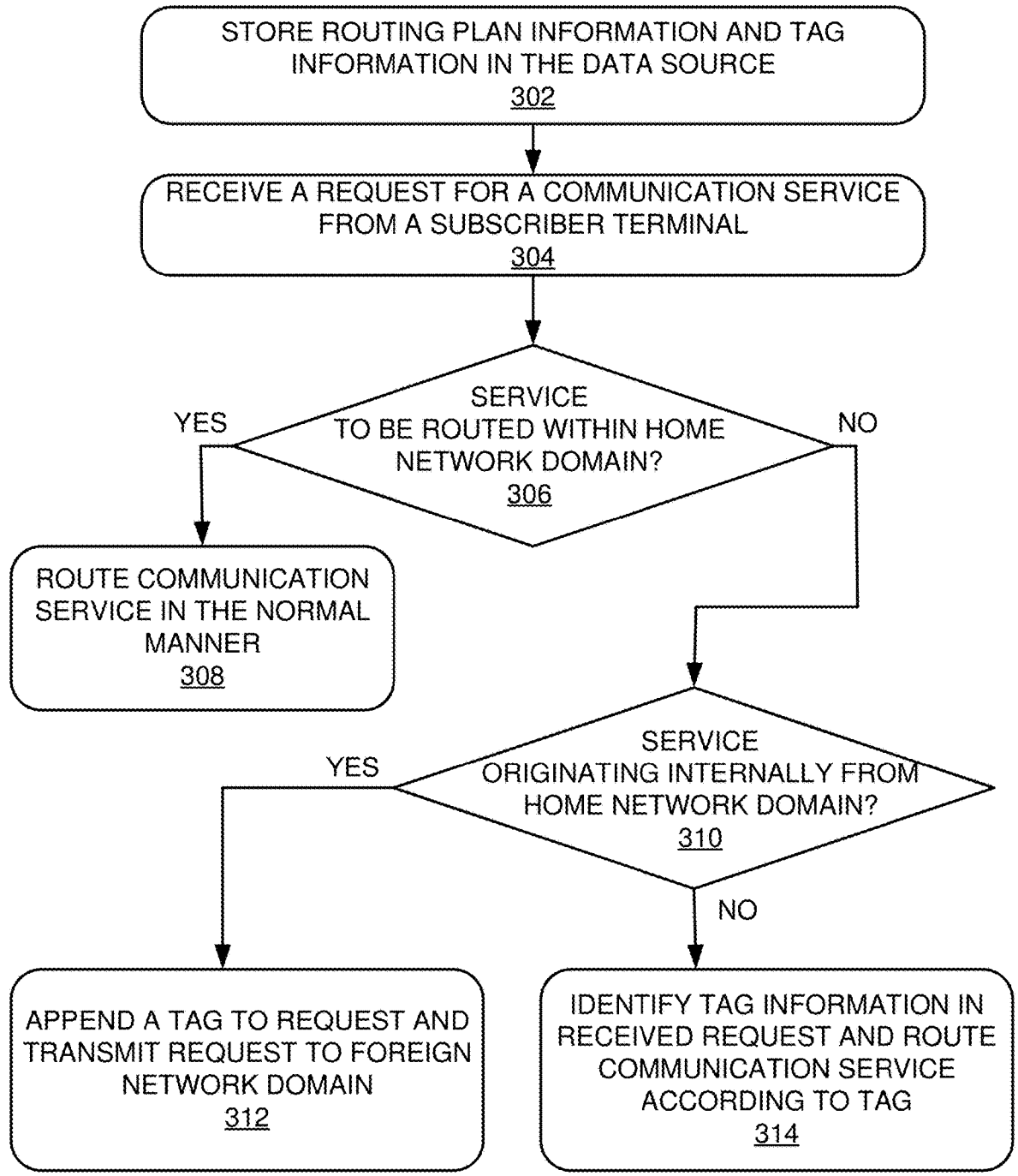
FIG. 3 is a flowchart depicting an example process for routing a communication service according to a service plan associated with the subscriber initiating the request according to one aspect of the present disclosure.

FIG. 3 illustrates an example process that may be performed by the core routing engine 108 according to the teachings of the present disclosure.

In step 302, the CRE 108 stores routing plan information and tag information in the data source 110. The routing plan information may include information based upon certain routes to be constructed through the network domain that achieve a specified level of performance and/or provide a specified type and number of features. The tag information may be used for routing communication services originating from foreign network domains according to information included in the tag.

In step 304, the CRE 108 receives a request for a communication service from a subscriber terminal 116, 118. The request may be received from a dedicated access line of its own network domain (e.g., from AP 104), or alternatively, the request may be received from a subscriber terminal 118 of a foreign network domain 120.

In step 306, the CRE 108 determines whether the communication service is to be routed within the native network domain. If so, processing continues at step 308 in which the communication service is routed in the normal manner. However, if the communication service is to be routed outside the native network domain 102 or that the request originated outside the native network domain 102, processing continues at step 310.

In step 310, the CRE 108 determines whether the communication request originates internally, such as from an AP of the native network domain, or externally, such as from a foreign network domain. If so, processing continues at step 312; otherwise, processing continues at step 314.

In step 312, the CRE 108 appends a tag to the request and forwards the request to a CRE 122 of the foreign network domain 120 that is to route the communication service to its destination. In a particular embodiment in which the foreign network domain includes an Internet based network, the CRE 108 includes the tag information in a session initiation protocol-uniform resource identifier (SIP-URI).

In step 314, the CRE 108 identifies the tag information that was received with the request, and routes the communication service according to information included in the tag. In one embodiment, the route may be terminated within the native network domain 102. That is, the route may be terminated at an AP within the native network domain. In another embodiment, the destination of the request may be yet another foreign network domain 120. In this case, the CRE 108 may forward the request to a CRE associated with that foreign network domain for completing the communication service.

The process described above continues throughout operation of the differentiated routing system 100 for other requests for communication services from subscriber terminals 116, 118 or any other subscriber terminals. However, when use of the differentiated routing system 100 is no longer needed or desired the process ends.

It should be appreciated that the process described herein is provided only as an example and that the differentiated routing system 100 may execute additional steps, fewer steps, or differing steps than those described herein. For example, the steps 302 through 314 may be executed in any suitable order; that is, the steps as described in FIG. 3 are not limited to execution in any particular sequence. As another example, either of the steps 302 through 314 described herein may be executed by the CPS computing system 106 or may alternatively be performed by another computing system without departing from the spirit or scope of the present disclosure.

Figure 4:
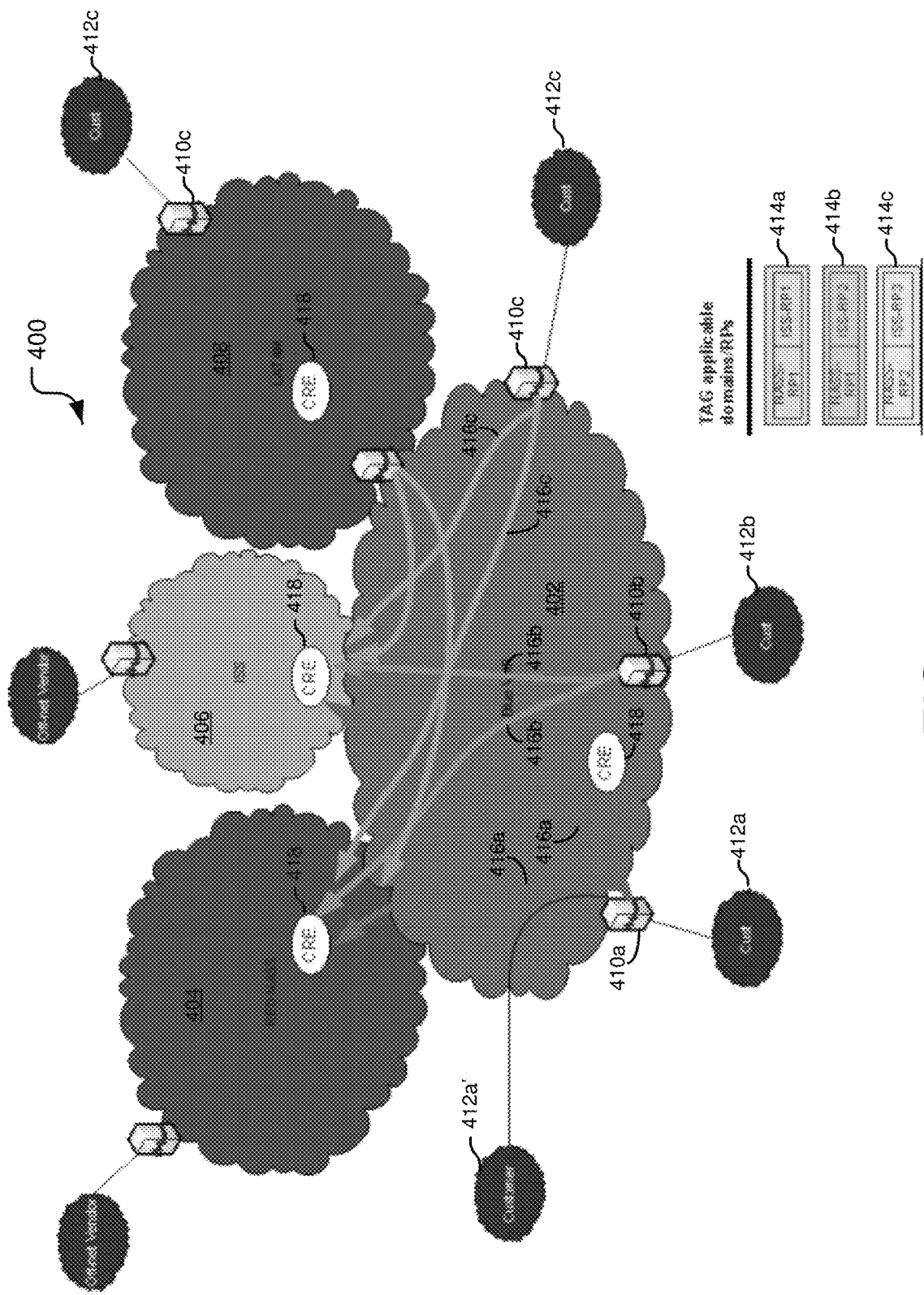
FIG. 4 illustrates an embodiment of a communication network showing how the differentiated routing system may be used to selectively route communication services among multiple network domains according to one aspect of the present disclosure.

FIG. 4 illustrates an embodiment of a communication network 400 showing how the differentiated routing system may be used to selectively route communication services among multiple network domains according to one aspect of the present disclosure. The communication network 400 includes a native VoIP network domain 402, a soft switch (SS) network domain 404, and an international switching system (ISS) network domain 406 that provides communication services to customers outside of the US, and a Latin America (LATAM) network domain 408 that provides communication services to customers in Latin America. Each network domain includes one or more access points 410 that provide network connectivity to subscriber stations of respective customers 412. Although the particular example communication network 400 shown describes a SS network domain 404, a ISS network domain 406, and a LATAM network domain 408, it should be understood that the communication network 400 may include any suitable type and number of network domains without departing from the spirit and scope of the disclosure.

Each network domain includes a CRE 418 that establishes routes for communication services provided through its respective network. For example, each CRE 418 receives requests for communication services through its network domain, authenticates each request, and allocates routes through its network domain to provide the requested communication services. Communication services for customers are provided using one or more routing packages (RPs) for each network domain. The term "routing package" within this disclosure refers to a specified set of paths through its respective network domain that are used to provide communication services that may be differentiated from other routing packages used in that network domain. That is, a first customer that is assigned with a first routing package may have its communication services routed through different network elements from another customer assigned with a second routing package. A tag 414 is used to provide information about the routing package associated with each customer to the CRE of foreign domains such that the CRE may implement differing routing package for each customer. That is, each tag 414 includes information that may be used by foreign network domains for routing communication request according to one of multiple routing packages.

For example, customers 412a and 412a' are configured to access the network 400 via access point 410a. Communication service requests 416a provided to customers 412a and 412a' may include those routed using a first tag 414a indicating a first routing package (RP1) of the SS network domain 404 and indicating a first routing package (RP1) of the ISS network domain 406. Conversely, communication service requests 416b provided to a customer 412c may include those routed using a second tag 414b indicating a first routing package (RP1) of the SS network domain 404 and indicating a second routing package (RP2) of the ISS network domain 406, and communication service requests 416c provided to customers 412c and 412c' may include those routed using a third tag 414c indicating a second routing package (RP2) of the SS network domain 404 and indicating a third routing package (RP3) of the ISS network domain 406. Using information included in each tag, the CRE 404 and 406 of the SS network domain 404 and ISS domain 406, respectively, may independently route communication services through its respective network domain according to information included in the tag when a request for communication services are received. That is, the CRE 404 and 406 may each route requests for communication services originating from customers 412a using differing routing parameters than is provided for customers 412b and/or 412c. Thus, communication services routed through each network domain may be differentiated based upon the access point that the subscriber terminal of the customer uses for access via tags associated with that access point.

Figure 5:
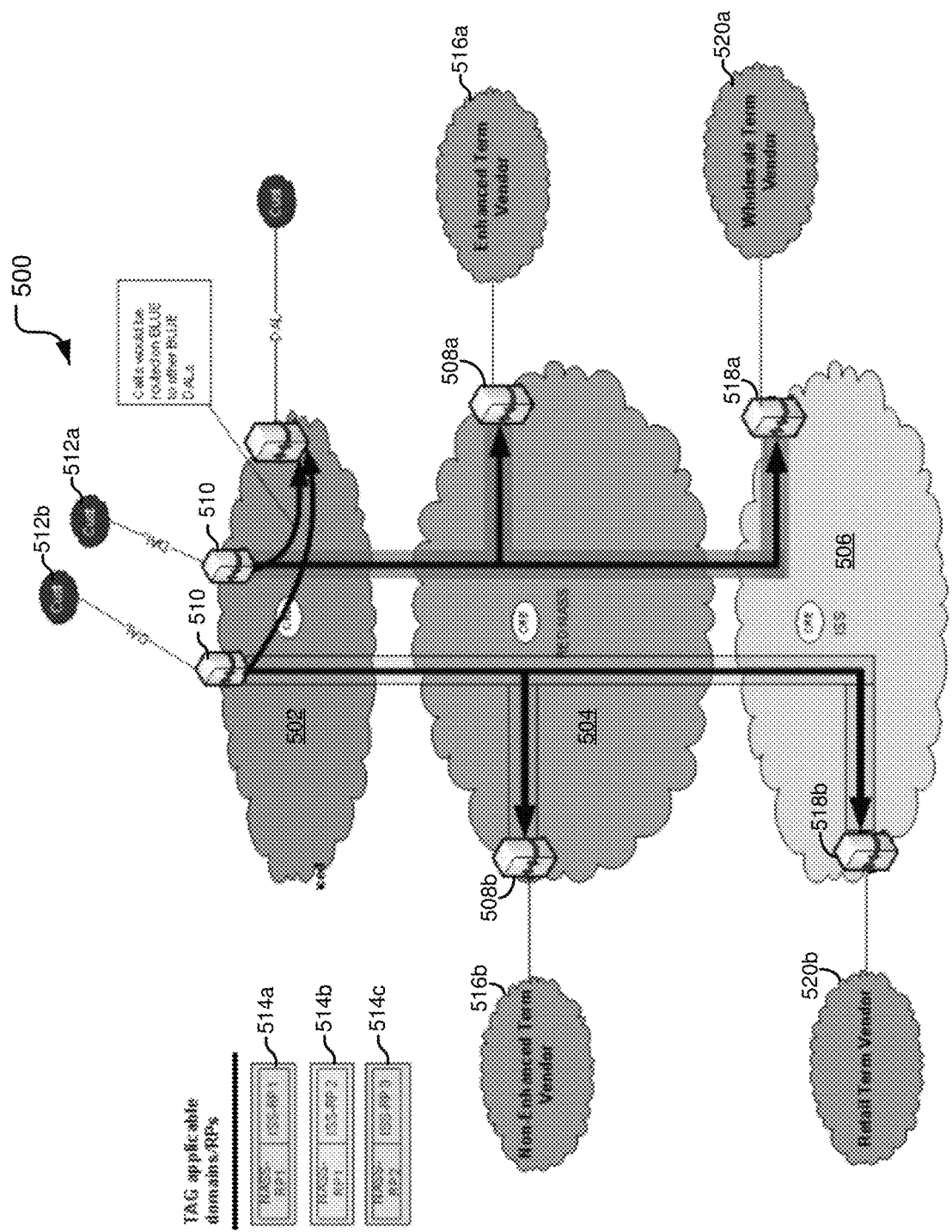
FIG. 5 illustrates an embodiment of a communication network showing how the differentiated routing system may be used to selectively route communication services across multiple network domains according to an aspect of the present disclosure.

FIG. 5 illustrates an embodiment of a communication network 500 showing how the differentiated routing system may be used to selectively route communication services across multiple network domains according to an aspect of the present disclosure. The communication network 500 includes a native network domain 502, a soft switch (SS) network domain 504, and an international switching system (ISS) network domain 506 that provides communication services to customers outside of the US. Although the particular example communication network 500 shown describes a native network domain 502, a SS network domain 504, and an ISS network domain 506, it should be understood that the communication network 500 may include any suitable type and number of network domains without departing from the spirit and scope of the disclosure.

The native network domain 502 includes access points 510a and 510b that provide network connectivity to subscriber stations of respective customers 512a and 512b. The SS network domain 504 includes access points 508a and 508b that provide connectivity to vendor networks 516a and 516b provided with enhanced level of services and non-enhanced level of services, respectively. Additionally, the ISS network domain 506 includes access points 518a and 518b that provide network connectivity for wholesale vendors 520a and retail vendors 520b, respectively. For example, a vendor 516a providing an enhanced level of services may be a regional bell operating company (RBOC), such as SOUTHWESTERN BELL TELEPHONE COMPANY™, while another vendor 516b providing a non-enhanced level of services may be discount provider, such as SKYPE™. Each customer 512a and 512b is configured to accesses the native network domain 502 via its respective access point 510a and 510b. Because each customer 512a and 512b is uniquely associated with its respective access point 510a and 510b, a unique tag 514a, 514b, or 514c may be associated with each request for communication services transmitted to an access point 510c within the native network domain 502, or vendor networks 516a, 516b, 520a, and/or 520b.

As shown, communication services provided to customers 512a, 512b may be differentiated based upon the destination network domain to which those communication services are provided using specified tags 514 associated with each access point 510. Communication services provided to a customer 512a may include those routed using a first tag 514a indicating a first routing package (RP1) of the SS network domain 504 and indicating a first routing package (RP1) of the ISS network domain 506, while communication services provided to a customer 512b may include those routed using a second tag 514b indicating a first routing package (RP1) of the SS network domain 504 and indicating a second routing package (RP2) of the ISS network domain 506. For example, when customer 512a requests a communication service to be routed through the SS network domain 504, the communication service will be routed through the vendor 516a providing an enhanced level of services due to information included in the tag 514a. Conversely, when customer 512b requests a communication service to be routed through the SS network domain 504, the communication service will be routed through the vendor 516b providing a non-enhanced level of services due to information included in its tag 514b. Additionally, communication services provided to either customer 510a, 510b may include those routed using a third tag 514c indicating a second routing package (RP2) of the SS network domain 504 and indicating a third routing package (RP3) of the ISS network domain 506.

FIGS. 6 through 9 illustrate several example use cases of the differentiated routing system that may be implemented on respective communication networks according to aspects of the present disclosure. Although only one example is described for each network, it will be understood that other examples may include additional, fewer, or different steps without departing from the spirit or scope of the present disclosure.

Figure 6:
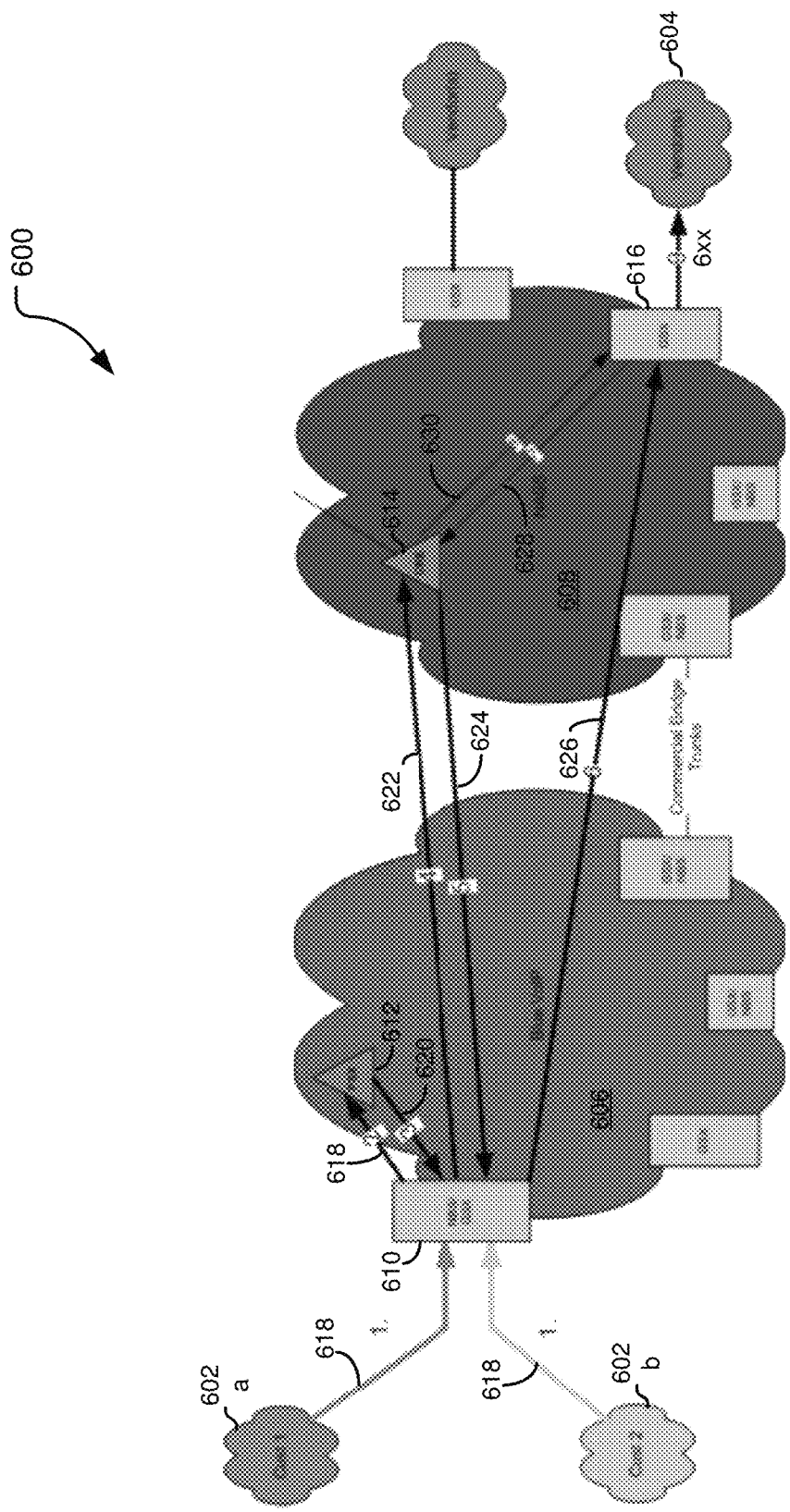
FIGS. 6 and 7 illustrate an example communication network and an associated process for setting up a communication service between one or more customers and a vendor in which the customers are provided access to the network via a first network domain and the vendor is provided with access to the network via a second network domain.
Figure 7:
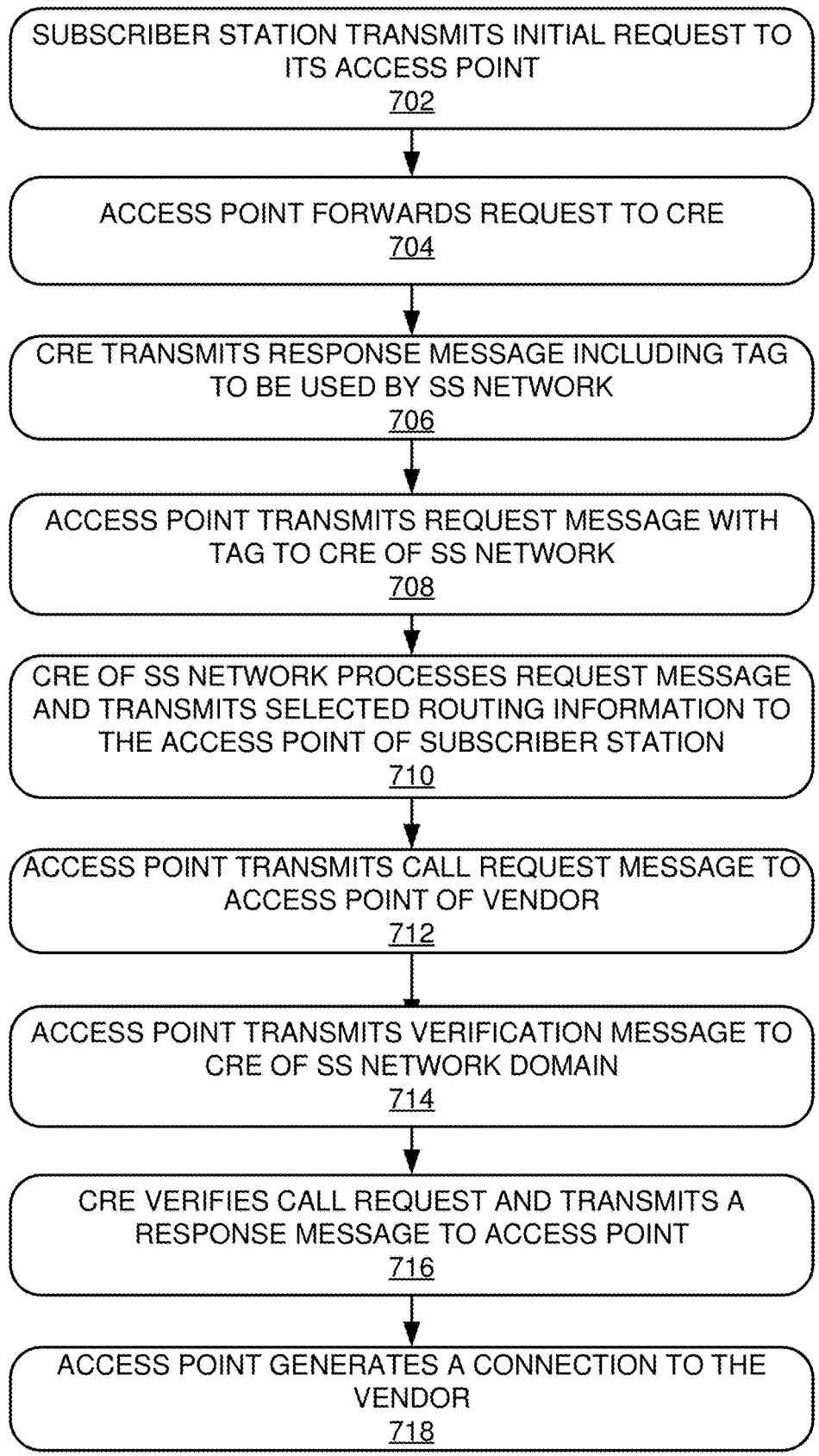

FIGS. 6 and 7 illustrate an example communication network 600 and an associated process 700 for setting up a communication service between customers 602a, 602b and a vendor 604 in which customers 602a, 602b are provided access to the network via a first VoIP network domain 606 and the vendor is provided with access to the network via a SS network domain 608. Although the particular example shown describes a communication service that may be set up with a vendor 604, other examples contemplate setting up a communication service with any type of remote node, such as another customer configured on another network domain.

Initially in step 702, a subscriber station of customer 602a transmits a request 618 for a communication service to an access point 610 associated with the customer. Next in step 704, the request 618 is forwarded to a core routing engine (CRE) 612 of the VoIP network domain 606. The CRE 612 then processes the request to determine information (e.g., network domain of vendor) associated with the vendor 604 who is to be connected with the customer via the communication service. In this particular case, the CRE 612 recognizes that the communication service is to be established with the vendor 604 through the SS network domain 608, which is foreign to its respective network domain, thus requiring a tag. Based upon this determined information, the CRE 612 transmits a response message 620 back to the access point 610 in which the response message includes a tag indicating routing package information to be used by the SS network domain 606 in step 706, and information identifying the CRE 614 of the SS network domain 608.

In step 708, the access point 610 transmits a request message 622 including the tag to the CRE 614 of the SS network domain 608 using the information received from the CRE 612. The CRE 614 then processes this received information to generate an appropriate path through its network domain and transmits information 624 associated with the generated path including identifying information associated with the access point 616 back to the access point 610 of the customer in step 710. In step 712, the access point 610 transmits an initial call request message 626 to an access point 616 associated with the vendor 604 using the received information. At this point, the access point 616 authenticates the initial call request message by transmitting a verification message 628 to the CRE 614 of the SS network domain 608 in step 714. The CRE 614 of the SS network domain 608 verifies the authenticity of the call request and responds by transmitting a response message 630 back to the access point 616 associated with the vendor 604 in step 716. Following receipt of the response message from the CRE 614, the access point 616 generates a connection to the vendor 604 in step 718. At this point, a communication service between the customer 602a or 602b and the vendor 604 has been completed.

It is important to note that the CRE 614 of the SS network domain 608 has knowledge of the tag and properly determines paths/routes through its network according to the received tag. That is, the CRE 614 generates different paths/routes and/or call monitoring functions through its network domain for each of multiple differing tags that it may receive. For example, telemarketers who typically generate large numbers of call requests may be segregated onto separate monitoring functions in the network such that these types of subscribers do not adversely affect metrics reported for other subscribers of the communication network. Additionally, call requests generated by the telemarketers may be restricted from certain trunks such that these trunks do not become overloaded due to bursts of outbound call requests typically generated by these telemarketers, which may adversely affect other inbound call requests.

Figure 8:
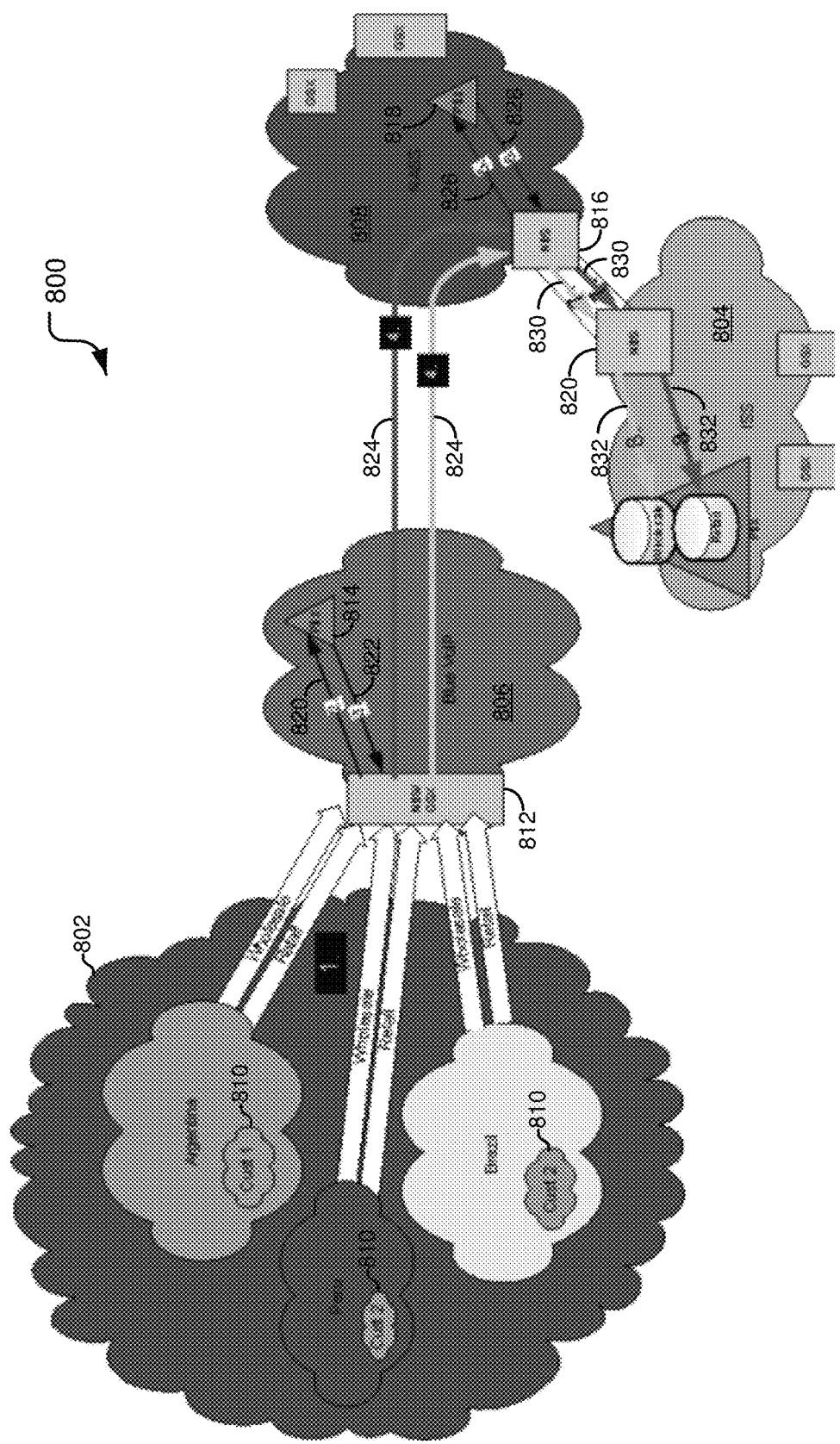
FIGS. 8 and 9 illustrate an example communication network and an associated process that shows how a communication service originated by customers in one or more foreign network domains may be terminated in an international switching service (ISS) network domain through one or more other network domains.
Figure 9:
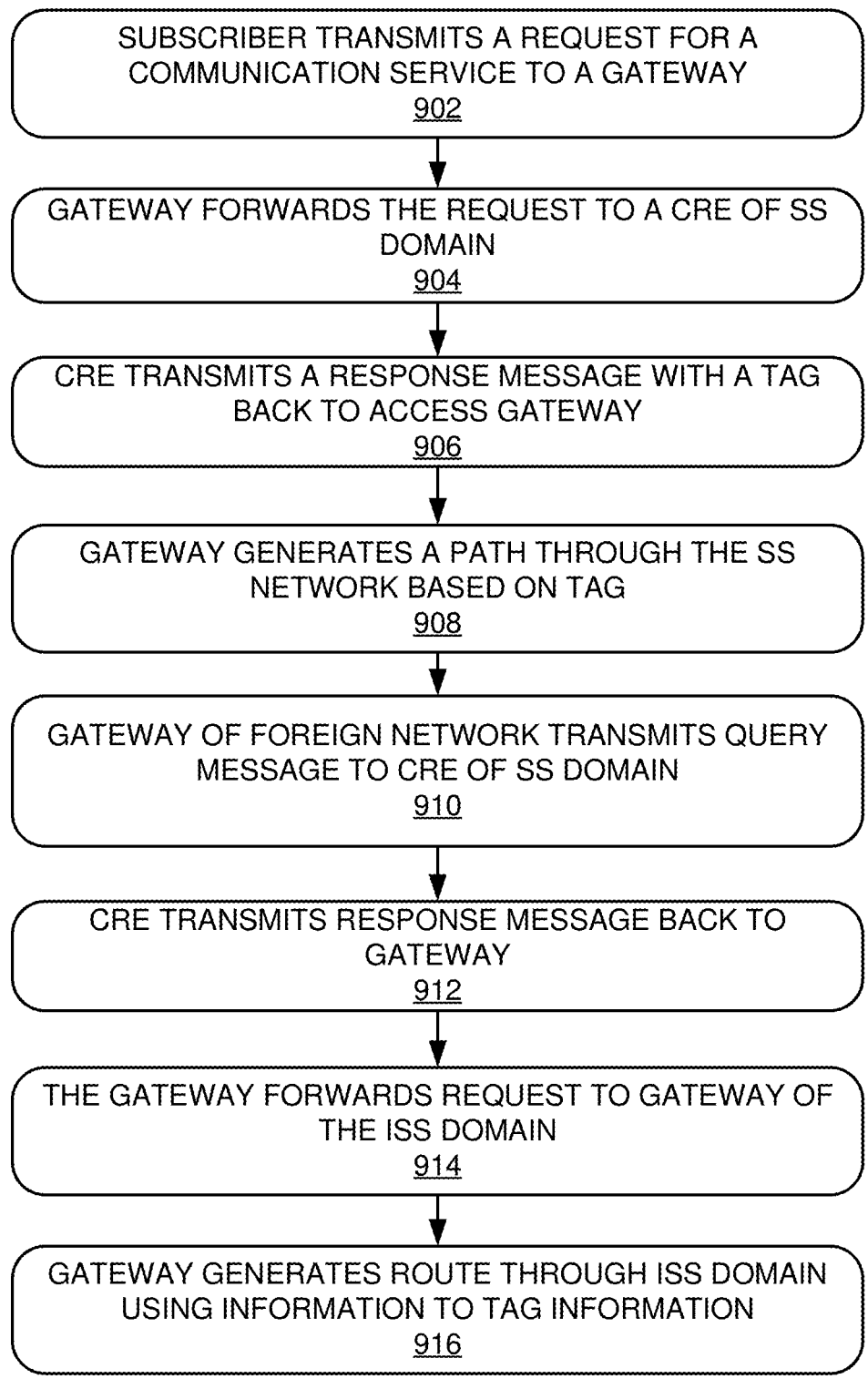

FIGS. 8 and 9 illustrate an example communication network 800 and an associated process 900 that shows how a communication service originated by customers in one or more Latin America network domains 802 may be terminated in an international switching service (ISS) network domain 804 through a domestic VoIP network domain 806 and a SS network domain 808. As shown, calls originating from the Latin America network domains 802 may be differentiated between differing types, such as wholesale type communication services and retail communication services.

Network domains 802 transmit requests for communication services that may be tagged as either wholesale or retail based services. That is, a Latin America network domain 802, via a subscriber station of a customer 810 transmits a request for a communication service to a gateway 812 of the domestic VoIP network domain 806 in step 902. Next, the gateway 812 forwards this request 820 along with a tag including the routing plan information to a core routing engine (CRE) 814 of the VoIP network domain 806 in step 904. The CRE 814 then processes the request to determine the routing plan information and based upon this determined information, the CRE 814 transmits a response message 822 back to the gateway 812 in which the response message includes routing information to be used by the domestic VoIP network domain 806 in step 906. In step 908, the gateway 812 generates a path through its network domain based upon routing information obtained from the CRE 814.

Because the routing plan information includes a path through the SS network domain 808, a gateway 816 of the SS network domain 808 receives a connection request 824 and queries a CRE 818 of the SS network domain 808 for routing information to be used through its respective network domain in step 910 using a query request message 826. In step 912, the CRE 818 responds by transmitting routing information 828 to be used for routing the communication service through its network domain. In step 914, the connection request 830 including the routing plan information is forwarded to a gateway 820 of the ISS network domain 804 which then constructs a route 832 through the ISS network domain 804 according to the routing information to its destination in step 916.

Although the use case of FIG. 8 has been described in terms of providing differentiated routing for wholesale and retail communication services, the use case as described above may be implemented for other purposes as well. For example, one routing scheme through the network domains may be implemented as overflow routes for instances where a primary routing scheme is temporarily operating at maximum capacity. In this case, the CRE 818 may determine that network elements (e.g., gateways 816 and 820) carrying traffic using the primary routing scheme is at or near capacity and instruct further connection requests to be diverted to other network elements until traffic carried through those network elements have been reduced.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing CRE) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A differentiated routing system comprising:
   a computing system comprising at least one processor and in communication with a subscriber terminal and a first network domain; and
   a core routing engine (CRE) executable by the at least one processor to:
   receive a request for a communication service from the subscriber terminal through an access point at which the subscriber terminal accesses the first network domain; and
   when the communication service is to be routed to a second network domain:
   identify the access point;
   include a tag in the request, the tag selected based on the identified access point, and the tag including information to be used by the second network domain for routing the communication service; and
   transmit the request to the second network domain, wherein the second network domain comprises a second CRE to:
   receive the request from the first network domain; and
   route the communication service through the second network domain according to the tag in the received request.

2. The system as recited in claim 1, wherein the access point provides a dedicated access line (DAL) for the subscriber terminal.

3. The system as recited in claim 1, wherein the first network domain and the second network domain both comprise internet protocol (IP) based networks.

4. The system as recited in claim 3, wherein the request comprises a session initiation protocol-uniform resource identifier (SIP-URI) and the tag is included in the SIP-URI.

5. The system as recited in claim 1, further comprising a third network domain having a third CRE to:
   receive the request from the second network domain; and
   route the communication service through the third network domain according to the tag in the received request.

6. The system as recited in claim 1, wherein the second CRE is further executable to:
   route the communication service through the second network domain according to information included in the tag.

7. The system as recited in claim 1, wherein the second CRE is further executable to:
   receive another request from another subscriber terminal, the other request comprising a tag that is different from the tag of the request; and
   monitor operating characteristics associated with the communication service provided to the subscriber terminal separately from operating characteristics associated with a communication service provided to the other subscriber terminal.

8. A differentiated routing method comprising:
   receiving a request for a communication service from a subscriber terminal by a first core routing engine (CRE) of a first network domain through an access point at which the subscriber terminal accesses the first network domain; and
   when the communication service is to be routed to a second network domain:
   identifying the access point;
   including a tag in the request, the tag selected based on the identified access point, and the tag including information to be used by the second network domain for routing the communication service;
   transmitting the request to the second network domain;
   receiving the request from the first network domain via a second CRE of the second network domain; and
   routing the communication service through the second network domain according to the tag in the received request.

9. The method as recited in claim 8, further comprising providing a dedicated access line (DAL) for the subscriber terminal using the access point.

10. The method as recited in claim 8, wherein the first network domain and the second network domain both comprise internet protocol (IP) based networks.

11. The method as recited in claim 10, further comprising appending the tag in a session initiation protocol-uniform resource identifier (SIP-URI).

12. The method as recited in claim 8, further comprising:
    receiving the request from the second network domain via a third CRE of a third network domain; and
    routing the communication service through the third network domain according to the tag in the received request.

13. A communication network comprising:
    a first network domain in communication with a subscriber terminal; and
    a second network domain in communication with the first network domain;
    wherein the first network domain comprises a computing system having at least one processor that executes a core routing engine (CRE) to:

receive a request for a communication service from the subscriber terminal through an access point at which the subscriber terminal accesses the first network domain; and when the communication service is to be routed to a second network domain:

identify the access point;

include a tag in the request, the tag selected based on the identified access point, and the tag including information to be used by the second network domain for routing the communication service; and transmit the request to the second network domain;

wherein the CRE is further executed to:

receive, via a second CRE of the second network domain, the request from the first network domain; and route the communication service through the second network domain according to the tag included in the received request.

14. The communication network as recited in claim 13, wherein the first network domain and the second network domain both comprise internet protocol (IP) based networks.

15. The communication network as recited in claim 13, wherein the CRE is further executed to perform appending the tag to a session initiation protocol-uniform resource identifier (SIP-URI), and transmitting the SIP-URI to the second network domain.

16. The communication network as recited in claim 13, wherein the CRE is further executed to route the communication service through the second network domain according to information included in the tag.

17. The communication network as recited in claim 13, wherein the CRE is further executed to:

receive another request from another subscriber terminal, the other request comprising a tag that is different from the tag of the request; and monitor operating characteristics associated with the communication service provided to the subscriber terminal separately from operating characteristics associated with a communication service provided to the other subscriber terminal.

* * * * *